Feb. 16, 1965  F. KESSLER ETAL  3,169,462
IRIS DIAPHRAGM SHUTTER
Filed July 28, 1961
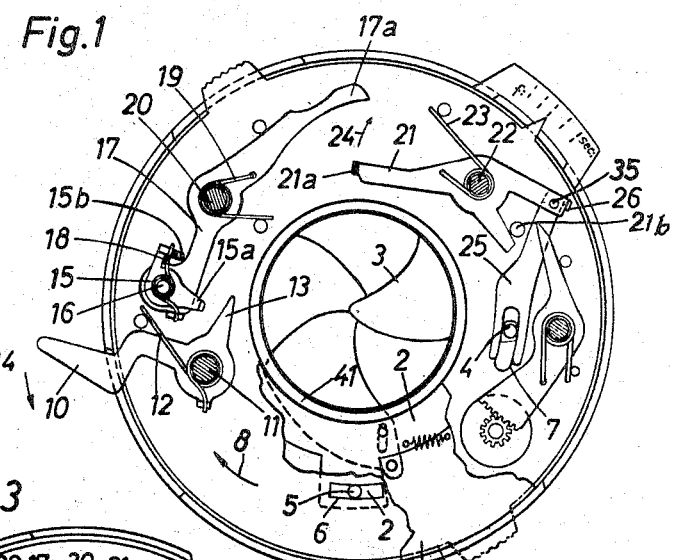
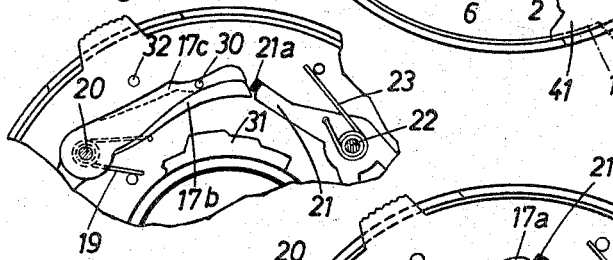
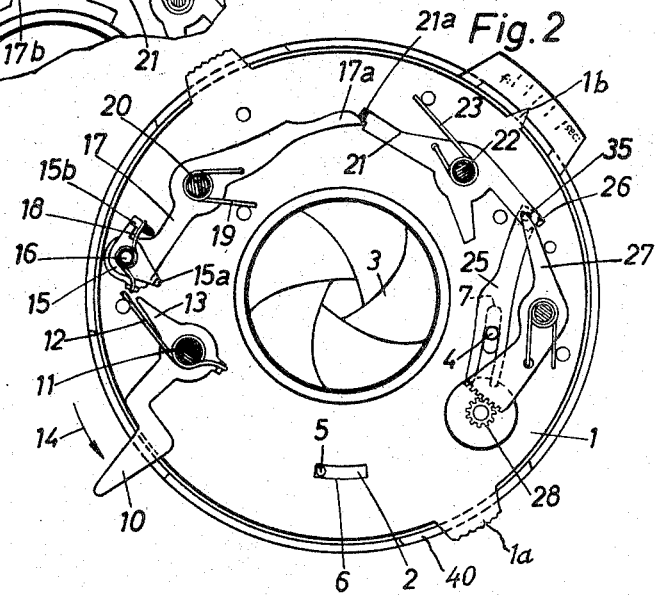
INVENTOR.
FRITZ KESSLER
FRANZ JAKOB
ROLAND KNORR
BY
Attorney

United States Patent Office 3,169,462
Patented Feb. 16, 1965

3,169,462
IRIS DIAPHRAGM SHUTTER
Fritz Kessler and Franz Jakob, Unterhaching, and Roland Knorr, Munich, Germany, assignors to Agfa Aktiengesellschaft, Leverkusen-Bayerwerk, Germany
Filed July 28, 1961, Ser. No. 127,741
Claims priority, application Germany, Aug. 2, 1960,
A 35,252
11 Claims. (Cl. 95—63)

The present invention relates to a photographic shutter arrangement, and more particularly, to an iris diaphragm shutter in which the shutter blades form an iris diaphragm.

Shutter arrangements of this type in which the opening of the shutter is limited to a selected aperture, are known.

It is the object of the present invention to provide an iris diaphragm shutter of very simple construction which is suitable for simple and inexpensive photographic cameras.

Another object of the present invention is to provide a shutter of this type which reliably operates, and has at least three shutter sections.

Another object of the present invention is to provide an iris diaphragm shutter in which the aperture can be set and determined by the same elements which are required for obtaining the shutter operation, so that no additional element is required in the shutter arrangement of the present invention for determining the desired aperture.

With these objects in view, one embodiment of the invention comprises a shutter mounted on supporting means and including an operating member movable along a predetermined path; a shutter actuating unit mounted on the supporting means for movement between a plurality of positions and including a shutter actuating member adapted to engage the operating member and to move it along the predetermined path different distances which depend on the position of the shutter actuating unit relative to the supporting means and to the shutter. When the position of the shutter actuating unit is adjusted, the distance which the shutter operating member is moved along the predetermined path by the shutter actuating member is determined. The shutter is constructed in such a manner that its characteristics, for example its aperture, depends on the distance which the shutter operating member moves along the predetermined path, and consequently by setting the shutter actuating unit, the aperture can be selected.

In the preferred embodiment of the invention, an iris diaphragm shutter is operated by a pin which is connected to the drive ring of the iris diaphragm. This pin moves in a slot of an adjustable plate, and by adjustment of the plate the position of the end of the slot relative to the pin is determined, so that the distance through which the pin can move, and thereby the opening or aperture of the iris diaphragm is determined. The pin is actuated by a shutter mechanism which is mounted on the adjustable plate so that by adjustment of the plate the distance of relative movement between the actuating member of the shutter actuating means, and the pin is determined.

The actuating member includes a fork-shaped portion embracing the pin. Preferably, another pin is provided on the drive ring of the iris diaphragm, and moves in a corresponding slot of the adjustable plate.

The exposure time, that is the time during which the iris diaphragm is open, can be influenced by a suitable retarding mechanism which slows down the motion of the fork-shaped actuating member.

In a modified embodiment of the invention, a spring loaded member which operates the shutter is delayed during its returning movement by a composite abutment face formed by two overlapping members which are set in accordance with the desired time of exposure.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevation of one embodiment of the present invention in a position of rest in which the shutter is closed;

FIG. 2 is a side elevation of the embodiment of FIG. 1 in another operational position; and FIG. 3 is a fragmentary elevation illustrating a modified part of the shutter arrangement according to the present invention.

Referring now to the drawings, and more particularly to FIGS. 1 and 2, a shutter actuating unit includes a circular plate 1 forming an adjustable plate means and having a central opening, and a shutter drive means mounted in its entirety on plate 1 so as to be adjustable therewith. Plate 1 is superimposed on an iris diaphragm shutter forming a shutter means which is movable between a fully closed and a fully open position and including a set of iris diaphragm blades 3, and a drive ring 2 which is connected to the diaphragm blades, and effects movement of the same between the closed position as shown in FIG. 1 and a plurality of open positions, one of which is shown in FIG. 2, and in which the diaphragm blades 3 define apertures of different size. A pair of pins 4 and 5 is secured to drive ring 2, and projects through slots 6 and 7 in plate 1. As shown in FIG. 1, in the position of rest of the shutter mechanism, pin 5 is located near the center of slot 6, while pin 4 is located near the upper end of slot 7. Since pins 4 and 5 are secured to the drive ring 2 of the iris diaphragm shutter, movement of pin 4 in the direction of the arrow 8 in FIG. 1 will effect opening of the diaphragm. In the position of FIG. 2, pin 4 has been moved in slot 7, and pin 5 has been moved in slot 6 until abutting the end of slot 6, so that no further turning of the drive ring 2 is possible. Thus, the pin 5 and the left end of the slot 6, as viewed in the drawings, form a stop means carried in part by the shutter means and in part by the adjustable plate means 1, and this stop means limits the movement of the shutter means from its fully closed toward its fully open position, the pin 5 forming a projection of the shutter means and the left end of the slot 6 forming a portion of the adjustable plate means 1 which is located in the path of movement of this projection. In this position, the diaphragm blades 3 define a certain aperture. When plate 1 is turned in the outer ring surrounding the same in the direction of the arrow, the end of the slot 6 moves away from pin 5, and it is possible to move pins 4 and 5 with the drive ring 2 farther in the direction of the arrow 8, whereby a greater aperture of the iris diaphragm would be obtained. Such different positions are indicated by a suitable pointer on plate 1, and by corresponding scale on the outer supporting ring which surrounds plate 1.

The shutter mechanism is mounted on plate 1, as explained above, and includes a first spring-loaded member which comprises a fork-shaped part articulated to a lever 21 which can be biased by a spring 23 which abuts a pin on plate 1. Spring 23 is tensioned in the position of FIG. 1 and urges lever 21 against a stop 21b so that the fork-shaped part 25 is retracted from pin 4. When lever 21 is turned in clockwise direction, spring 23 is further tensioned, and the fork-shaped portion 25 is moved toward pin 4 until it engages the same and pushes the same along slot 7 until pin 5 abuts the end of slot 6. Thus, the member 25 and the pin 4 form a transmission means for transmitting movement of the shutter drive means, formed by levers 17 and 21, to the shutter means, this transmission means thus being carried in part by the shutter means and in part by the shutter drive means, and of course the member 25 forms an output member connected to the shutter drive means for transmitting the drive therefrom through the elements 25 and 4 to the shutter means. It will be noted that the slot 7 is arcuate and extends along the circle of adjustable movement of the plate means 1 so that irrespective of the adjusted position of the plate means 1 the pin 4 will be moved by the bifurcated output member 25 in exactly the same way along exactly the same path, and thus the shutter will always be operated in the same way irrespective of the adjusted position of the plate means 1. A projection 26 is provided on an arm of lever 21, and turns another lever 27 which has a gear sector meshing with a gear 28 connected to a retarding mass which is turnable on plate 1. Consequently, the movement of lever 21 can be delayed by lever 27. The exact position of lever 27, and consequently the position in which it is engaged by the projection 26, is determined by a conventional cam which is set to determine the exposure time, such exposure time depending on the amount of retardation of lever 21 and its projection 26 with lever 27, as will be explained hereinafter in greater detail.

A second spring-loaded member 17 is turnably mounted on plate 1 by means of a pin 20, and is spring-loaded by a spring 19 which abuts a pin on plate 1. Another spring-loaded small lever 15 is mounted on lever 17 and has a projection 15a, and a pin 15b which cooperates with lever 17. Projection 15a cooperates with the arm 13 of release lever 10 which is biased by a spring 12 and mounted on a shaft 11 on plate 1.

When release lever 10 is depressed by the operator in the direction of the arrow 14, its projection 13 engages projection 15a of lever 15, and turns the same about pin 16 to a position in which pin 15b abuts lever 17 so that lever 15 is rigidly connected to lever 17. Further turning of lever 10 will effect turning of lever 17 to the position shown in FIG. 2. Lever 21 has a wedge-shaped projection 21a with an inclined guide face facing toward portion 17a, and a shoulder on the thicker side of the wedge. During further turning movement of lever 17, portion 17a slides over the guide face of projection 21a resiliently displacing lever 21, and when portion 17a is on the other side of projection 21a, it snaps behind the shoulder at the thicker end of the wedge-shaped projection 21a. During further turning movement of release lever 10, arm 13 releases projection 15a, so that lever 17 is released, and is rapidly moved by its tensioned spring 19 to abut the shoulder on projection 21a and to turn lever 21 in clockwise direction of the arrow 24 so that fork-shaped member 25 is pushed downwardly to the position shown in FIG. 2 in which it pushes pin 4 downwardly in slot 7 until such movement is limited by the engagement of pin 5 with the end of slot 6. Since pins 4 and 5 are connected to the drive ring of the iris diaphragm 3, the same is opened the size of the aperture depending on the relative position between plate 1 and drive ring 2 with pin 5. When the end face of arm 17 slides off the projection 21a, lever 21 and fork-shaped part 25 are pulled back in counterclockwise direction by spring 23 and resume again the position of rest shown in FIG. 1 in which an arm of lever 21 abuts the stop pin 21b. Plate 1 has projections 1a by which it can be turned, such projections moving in cutout 40 of the stationary fixed ring member 41. Either projections 1a, or the pointer 1b engages corresponding serrations or roughened surface portions of ring 40 to secure plate 1 in manually adjusted positions in which the end of slot 2 is spaced different distances from pin 5 in the position of rest of the shutter mechanism. The setting positions of plate 1 determine the distance of movement of pin 5, and thereby the length of the path of the movement of pin 4 in slot 7 on which the size of the aperture of the iris diaphragm shutter depends.

When the shutter mechanism returns to its position of rest under the action of springs 23, 19 and 12, a spring, which is connected to drive ring 2, pulls the iris diaphragm to its closed position shown in FIG. 1.

In order to vary the time of exposure, lever 27, which cooperates with the gear 28 of the retarding wheel means, is set to different positions located in the path of the projection 26. Such setting can be accomplished in a conventional manner by a timing cam, not shown, which turns when the time of exposure is set on the camera to place lever 27 in a desired position in the path of projection 26 of the spring-loaded lever 21.

In the modified embodiment shown in FIG. 3, the entire mechanism corresponds to the embodiment of FIGS. 1 and 2, with the retarding lever 27, and the retarding means 28 omitted. The setting of the exposure time is accomplished in the embodiment of FIG. 3 by providing lever 17 with two overlapping arms 17b and 17c, the arm 17c being provided with a projecting pin 30 cooperating with a timing cam 31. Timing cam 31 is turned when the exposure time is set so that cam portions of different radial extension cooperate with pin 30.

When lever 17 with its two arms 17b and 17c is released by the release lever 10, spring 19 urges both arms 17b and 17c against the stop pin 32 so that the arms are placed in an exactly superimposed and completely aligned position. When release lever is actuated, and lever 17 is turned in clockwise direction, arm 17b slides over the inclined face 21a of lever 21 as explained with reference to FIG. 1, and during further clockwise movement, pin 30 abuts a selected portion of cam 31 so that lever arm 17c cannot move any further, while lever arm 17b passes cam 31 and moves further corresponding to the displacement obtained by the release lever 10. In this manner, the two overlapping arms 17b and 17c are angularly displaced, for example to the position shown in FIG. 3, and tend to remain in such displaced position due to resilient frictional engagement, or due to small catch notches provided on the surface of arm 17b and cooperating with the rear end of pin 30.

When release lever 10 releases projection 15a, and thereby lever 17, spring 19 rapidly turns lever 17 with its angularly displaced arms 17b and 17c in counter-clockwise direction so that the two end faces of lever arms 17c and 17b pass the shoulder of the projection 21a and turn lever 21 in clockwise direction, as described with reference to FIG. 1. However, due to the longer end face provided by the two angularly displaced arms 17c and 17b, lever 21 will be released at the later moment, and thereby time of exposure will be extended corresponding to the length of the combined end faces of arms 17c and 17b, such length depending on the selection by means of cam 31.

When lever 17 reaches its end position abutting stop 32, lever arm 17c is pushed into a position aligned with lever arm 17b.

Both embodiments of the invention have the most important feature of the invention in common, namely the setting of the aperture by turning of the plate 1 together with the entire shutter mechanism relative to the shutter actuating member 2, 4, and 5. By this construction, the aperture is set, while only the elements required for the operation of the shutter are used so that not a single additional member is required. All elements provided in accordance with the present invention for obtaining a shutter operation, and the desired aperture, would also be necessary if a constant aperture would be maintained, and only the shutter operated. Even the slots 6 and 7 are not additional elements, since slots have to be provided for obtaining the shutter actuation. It is only necessary to design the slots 6 and 7 to have a predetermined length, and to make plate 1, which carries the shutter mechanism adjustable to different angular positions relative to the shutter actuating member 2, 4 to determine the distance which the pin 4 of the shutter actuating member moves until stopped by plate 1.

Since the construction of the present invention eliminates independent means for setting the aperture, the shutter mechanism of the present invention is particularly simple and advantageous, and extremely well suited for inexpensive cameras.

It will be understood that each of the elements described above, or two or more together, may also find a useful application in other types of shutter mechanism differing from the types described above.

While the invention has been illustrated and described as embodied in an iris diaphragm shutter mechanism in which a support carrying the entire shutter mechanism is adjustable relative to the actuating member of an iris diaphragm shutter to determine the aperture of the shutter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A photographic shutter mechanism comprising, in combination, supporting means; a shutter mounted on said supporting means and including an iris diaphragm movable between a closed position and a plurality of open positions defining different apertures, said shutter including shutter operating ring and a pair of pins secured to said ring, said ring and said pins being movable between a position of rest in which said iris diaphragm is in said closed position, at the plurality of operative positions in which said iris diaphragm is in said open positions, respectively; a supporting plate turnably mounted on said supporting means for turning movement about an axis coinciding with the center of said iris diaphragm, and having a pair of part-circular slots, said pins being respectively, located in said slots, said plate being turnable with said slot relative to said pins between a position of rest, and a plurality of setting positions in which the end of at least one of said slots is located in the path of movement of the respective pin for stopping the same and thereby said ring in said operative positions, respectively; and a shutter actuating mechanism mounted on said plate and including a first spring-loaded member including a fork-shaped portion embracing the other pin, a second spring-loaded member, and a release lever, said release lever tensioning said second spring-loaded member while turning the same from a position located on one side of said first spring-loaded member to a position located on the other side of said first spring-loaded member so that upon release of said second spring-loaded member, said second spring-loaded member moves rapidly against said first spring-loaded member to move the same with said fork-shaped portion against said other pin for moving said other pin until said one pin is stopped by the end of said slot, whereupon said first and second spring-loaded members turn to their initial positions.

2. A photographic shutter mechanism as set forth in claim 1 and including retarding means; and wherein said first spring-loaded member has a portion engaging said retarding means during movement of said first spring-loaded member so that the movement of the same and thereby the shutter operation is delayed.

3. A photographic shutter mechanism as set forth in claim 1 wherein said second spring-loaded member includes two arms slidable relative to each other, one of said arms having a projection; and a control means for setting said arms to different relative positions, said arms in said different positions defining abutment faces of different lengths cooperating with said first spring-loaded member during movement of said second spring-loaded member from said tensioned position to said untensioned position whereby the time during which said shutter remains open is varied.

4. A photographic shutter mechanism as set forth in claim 3 wherein said control means includes a cam settable to different positions and cooperating with said projection.

5. A photographic shutter mechanism as set forth in claim 3 and including a stop cooperating with said arms of said second spring-loaded member to move said arms to a superimposed aligned position when said second spring-loaded member is in said untensioned position.

6. In a camera, in combination, support means; shutter means carried by said support means and movable along a predetermined path from a fully closed position to a fully open position; adjustable plate means carried by said support means for movement between a plurality of predetermined adjusted positions; shutter drive means carried in its entirety by said plate means for movement therewith during adjustment thereof; transmission means carried in part by said shutter means and in part by said shutter drive means for transmitting movement of said shutter drive means to said shutter means, said shutter drive means acting through said transmission means on said shutter means for moving the latter from said fully closed position toward said fully open position; and stop means carried by said adjustable plate means and cooperating with said shutter means for limiting the extent of movement of said shutter means along said predetermined path from said fully closed to said fully open position to different extents in accordance with the particular predetermined adjusted position to which said adjustable plate means is moved.

7. In a camera as recited in claim 6, said stop means including a projection carried by said shutter means and movable along a given path during movement of said shutter means from said fully closed toward said fully open position thereof and a portion of said adjustable plate means located in the path of movement of said projection to be positioned with respect thereto during adjustment of said adjustable plate means at a distance from said projection limiting the extent of movement of said shutter means from said fully closed toward said fully open position thereof to an adjustable limit determined by the engagement of said projection with said portion of said plate means.

8. In a camera as recited in claim 7, said projection being in the form of a pin movable along a circular path and said plate means being formed with an arcuate slot located along said path, receiving said pin, and having an end which forms said portion of said plate means which limits the movement of said pin and thus the extent of movement of said shutter means from said fully closed toward said fully open position thereof.

9. In a camera as recited in claim 6, said transmission means including an output member operatively connected to said shutter drive means and moved thereby along a given path and a projection carried by said shutter means and located in the path of movement of said output member to be engaged and moved thereby in exactly the same way at least during the initial portion of the movement of said shutter drive means irrespective of the adjusted position of said plate means.

10. In a camera as recited in claim 9, said support means supporting said plate means for circular adjustable movement and said transmission means including a pin carried by said shutter means and said plate means being formed with an arcuate slot receiving said pin and extending along the path of adjustable movement of said plate means so that said pin moves along the same path irrespective of the adjusted position of said plate means, and said output member having a bifurcated portion receiving said pin, whereby said shutter means is always operated in exactly the same way during movement from its closed toward its fully open position irrespective of the adjusted position of said plate means.

11. In a camera as recited in claim 6, said plate means being manually adjustable.

References Cited by the Examiner
UNITED STATES PATENTS

| | | | |
|---|---|---|---|
| 382,858 | 5/88 | Bausch | 95—63 |
| 436,404 | 9/90 | Dallmeyer | 95—63 |
| 761,756 | 6/04 | Brueck | 95—63 |

NORTON ANSHER, *Primary Examiner.*

JOHN M. HORAN, *Examiner.*